United States Patent
Rud

(10) Patent No.: US 9,470,580 B2
(45) Date of Patent: Oct. 18, 2016

(54) INFRARED SENSOR

(71) Applicant: Rosemount Inc., Chanhassen, MN (US)

(72) Inventor: Jason Harold Rud, Mayer, MN (US)

(73) Assignee: Rosemount Inc., Shakopee, MN (US)

( * ) Notice: Subject to any disclaimer, the term of this patent is extended or adjusted under 35 U.S.C. 154(b) by 504 days.

(21) Appl. No.: 14/037,963

(22) Filed: Sep. 26, 2013

(65) Prior Publication Data

US 2015/0085897 A1  Mar. 26, 2015

(51) Int. Cl.
*G01J 5/12* (2006.01)
*G01J 5/14* (2006.01)

(52) U.S. Cl.
CPC ... *G01J 5/12* (2013.01); *G01J 5/14* (2013.01)

(58) Field of Classification Search
CPC ........ G01J 5/12; G01J 2005/123; G01J 5/14; G01K 7/16; G01K 2007/163; G01K 7/18; G01K 7/183; G01K 7/02; G01K 7/021
USPC ........ 374/121, 185, E7.018, E7.021, E7.022
See application file for complete search history.

(56) References Cited

U.S. PATENT DOCUMENTS

| | | | | |
|---|---|---|---|---|
| 5,178,464 A * | 1/1993 | Fraden | ...................... | G01J 5/52 250/338.1 |
| 5,829,876 A | 11/1998 | Schwartz et al. | | |
| 5,876,122 A | 3/1999 | Eryurek | | |
| 6,320,450 B1 | 11/2001 | Lee et al. | | |
| 7,826,991 B2 | 11/2010 | Schumacher | | |
| 2004/0066832 A1 * | 4/2004 | Lin | ........................... | G01J 5/04 374/120 |
| 2004/0125857 A1 * | 7/2004 | Sprock | ................... | G01K 7/206 374/185 |
| 2005/0224715 A1 * | 10/2005 | Devine | ..................... | G01J 5/06 250/338.1 |
| 2006/0262829 A1 * | 11/2006 | Manlove | .................. | G01J 5/16 374/120 |
| 2007/0183475 A1 * | 8/2007 | Hutcherson | ............... | G01J 5/16 374/120 |
| 2007/0183478 A1 * | 8/2007 | Becker | ................... | G01K 15/00 374/183 |
| 2008/0225925 A1 * | 9/2008 | Laverdiere | ............ | G01J 5/0037 374/130 |
| 2010/0061422 A1 * | 3/2010 | Umkehrer | ................ | G01K 7/20 374/185 |
| 2010/0177800 A1 * | 7/2010 | Rud | ......................... | G01K 7/20 374/45 |
| 2012/0006989 A1 * | 1/2012 | Maston | .................... | G01J 5/041 250/340 |
| 2012/0179407 A1 * | 7/2012 | Ge | .......................... | G01K 1/20 702/99 |
| 2013/0248711 A1 * | 9/2013 | Lambkin | .................. | G01J 5/10 250/332 |

FOREIGN PATENT DOCUMENTS

JP   H0590646 A    4/1993
JP   2004177272 A  6/2004

OTHER PUBLICATIONS

International Search Report and Written Opinion, dated Nov. 26, 2014, for PCT Application No. PCT/US2014/051068, 8 pages.

* cited by examiner

*Primary Examiner* — Lisa Caputo
*Assistant Examiner* — Philip Cotey
(74) *Attorney, Agent, or Firm* — Kinney & Lange, P.A.

(57) ABSTRACT

An infrared sensor includes a thermopile connected in series with an ambient temperature compensation resistance temperature detector (RTD) and four electrical leads. The thermopile produces a voltage as a function of temperature of a point of interest, while the RTD varies in resistance as a function of ambient temperature. Two of the leads deliver current to energize the RTD. The other two leads are used for sensing voltages produced by the thermopile and the RTD.

20 Claims, 2 Drawing Sheets

INFRARED SENSOR

BACKGROUND

The present invention relates to temperature measurement devices. In particular, the invention relates to infrared sensors.

Infrared sensors, such as IR spot sensors (or infrared thermometers), are used to provide an output that represents a temperature of a point of interest. Many infrared spot sensors make use of both a thermopile and a resistance temperature detector (RTD). The thermopile produces an output voltage representing the temperature of a point of interest. The RTD, which is used for ambient temperature compensation, requires a current flowing through the RTD to produce a voltage that is a function of the resistance, and therefore a function of the ambient temperature.

To minimize overall lead wire count, the thermopile and RTD of the infrared sensor are each connected by two wires for two independent measurements. When measuring resistive devices, such as an RTD, with only two lead wires, the lead wire resistance generates error in the measurement by directly adding to the overall RTD sensor resistance.

One approach for addressing the error induced by lead wire resistance in a two wire RTD measurement is to use a large (higher resistance) RTD. For example, one infrared thermometer sensing head offered by Optris (model LT15) contains a thermopile and a PT1000 RTD. The PT1000 RTD has a nominal sensitivity of about 30 ohms/DegC, which helps to minimize the effects of lead wire impedance compared to a similar two wire circuit with a smaller RTD such as a PT100 RTD. However, due to its higher resistance, the large RTD sensor will amplify any electromagnetic interference (EMI) currents that it is exposed to, and will also require less resolution for digitization. This ultimately results in a noisier, less accurate two wire measurement produced by a PT1000 RTD ambient compensation resistor as compared to a smaller RTD device, such as a PT100 RTD.

SUMMARY

An infrared sensor includes a thermopile for producing a voltage as a function of temperature of a point of interest and an RTD that varies in resistance as a function of ambient temperature. The RTD and the thermopile are connected in a series circuit. Four electrical leads are connected to the series circuit. First and second leads are connected to the RTD; a third lead is connected to the RTD and the thermopile; and a fourth lead is connected to the thermopile. The four leads allow a three or four wire resistive measurement for ambient temperature compensation of the voltage output produced by the thermopile.

An infrared sensor includes a temperature sensor and measurement circuitry. The temperature sensor includes a thermopile having a first thermopile terminal and a second thermopile terminal, and an RTD having a first RTD terminal and a second RTD terminal. The first thermopile terminal is connected to the second RTD terminal. A first excitation current lead is connected to the first RTD terminal and a second excitation current lead is connected to the second RTD terminal. A first voltage sensing lead is connected to the first RTD terminal, and a second voltage sensing lead is connected to the second thermopile terminal. The measurement circuitry provides a temperature measurement value based upon a first voltage between the first and second sensing leads when no current flows through the first and second delivery leads, and a second voltage between the first voltage sensing lead and either the second voltage sensing lead or the second excitation current lead when excitation current flows through the first and second excitation current leads.

DETAILED DESCRIPTION

Figure 1:
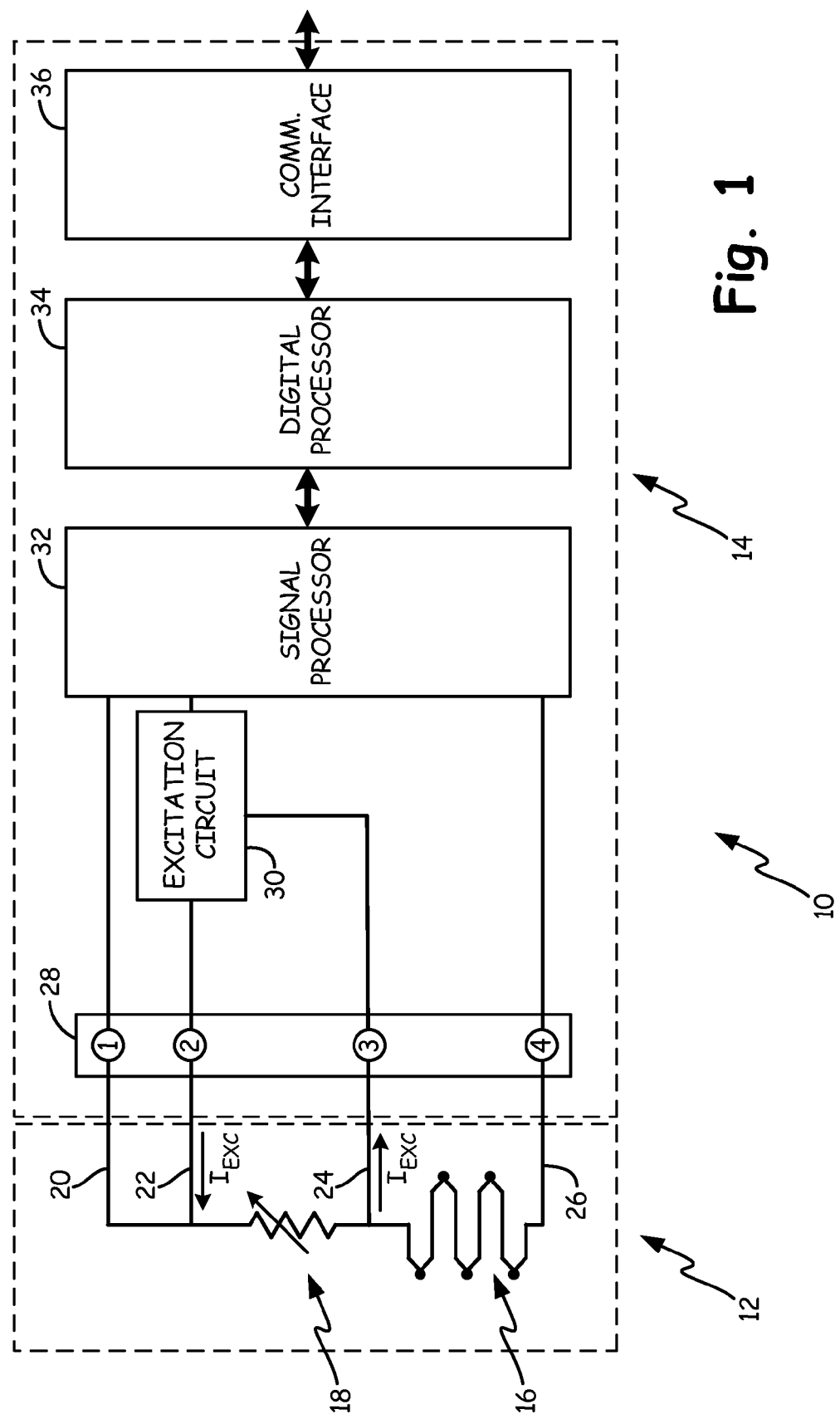
FIG. 1 is an electrical block diagram of an embodiment of an infrared spot sensor.

FIG. 1 shows an embodiment of infrared spot sensor (or infrared thermometer) 10, which includes IR thermal sensor 12 and transmitter 14. Infrared spot sensor 10 allows a four wire resistive measurement and a two wire millivolt thermopile output to be coupled together and measured using only four lead wires.

Sensor 12 includes IR sensing thermopile 16, ambient temperature compensation resistor RTD 18 (such as a PT100 RTD), and lead wires 20, 22, 24, and 26. Lead wires 20 and 26 are first and second voltage sensing lead wires respectively. Lead wires 22 and 24 are first and second excitation current leads, respectively.

Transmitter 14 includes excitation circuit 30, signal processor 32, digital processor 34 and communication interface 36. Signal conversion, conditioning, and transmission are the principal functions of transmitter 14.

Terminal block 28 provides the interconnection between sensor 12 and the circuitry of transmitter 14. In the embodiment shown in FIG. 1, terminal block 28 includes four terminals labeled 1-4. First voltage sensing lead 20 of sensor 12 is connected to terminal 1. Second voltage sensing lead 26 is connected to terminal 4. First and second excitation current leads 22 and 24 are connected to terminals 2 and 3, respectively, of terminal block 28.

Excitation circuit 30 provides excitation current $I_{EXC}$, which flows through RTD 18 to produce an ambient temperature compensating voltage $V_{COMP}$ that is a function of ambient temperature of sensor 12.

Signal processor 32 receives voltage from terminals 1 and 4 of terminal block 28 and converts the voltage between terminals 1 and 4 to a digital value. That digital value is provided to digital processor 34.

In the embodiment shown in FIG. 1, signal processor 32 provides voltage values that represent two separate measurements. Signal processor 32 (or alternatively digital processor 34) controls operation of excitation circuit 30, so that the voltage between terminals 1 and 4 can be measured with excitation current $I_{EXC}$ turned off for a first voltage measurement, and with excitation current $I_{EXC}$ turned on for a second voltage measurement. The first and second voltage measurements can be performed alternately and in either order.

Thermopile 16 produces a voltage $V_{DET}$ which is a function of infrared radiation received by thermopile 16. Because thermopile 16 is a thermal sensor, ambient temperature of IR sensor 12 will affect the value of $V_{DET}$. For that reason, ambient temperature compensation resistor 18 is used to produce ambient temperature compensation signal $V_{COMP}$. Resistance $R_{COMP}$ of ambient temperature compensation resistor 18 varies as a function of ambient temperature of sensor 12. Compensation signal $V_{COMP} = I_{EXC} \cdot R_{COMP}$.

With the arrangement of leads 20, 22, 24, and 26 shown in FIG. 1, voltage is sensed between terminals 1 and 4 of terminal block 28. For the first voltage measurement, excitation circuit 30 is turned off and therefore, no current flows through compensation resistor 18. With no current flow through resistor 18, the voltage drop across compensation resistor 18 is zero. First voltage $V_1$ between terminals 1 and 4 is equal to the voltage produced by thermopile 16, i.e., $V_1=V_{DET}$. Signal processor 32 converts first voltage $V_1$ to a digital value, and provides that value to digital processor 34.

A second voltage measurement is made by signal processor 32 with excitation circuit 30 turned on. During the second measurement, second voltage $V_2$ between terminals 1 and 4 is equal to thermopile voltage plus ambient temperature compensation voltage, i.e., $V_2=V_{DET}+V_{COMP}$. Second voltage $V_2$ is also converted to a digital value and provided to digital processor 34.

Digital processor 34 performs compensation of thermopile voltage $V_{DET}$ as a function of ambient temperature to produce an ambient compensated temperature measurement of the point of interest being monitored by IR sensor 12. Digital processor 34 obtains a value representing ambient temperature by subtracting the value representing voltage $V_1$ from the value representing voltage $V_2$. As a result, digital processor 34 then has values representing $V_{DET}$ and $V_{COMP}$. With those values, digital processor 34 derives a compensated temperature measurement value that is representative of the temperature of the spot being monitored by sensor 12.

Digital processor 34 supplies the compensated temperature measurement value to communication interface 36, which communicates that value to a monitoring or control system (not shown). The communication by communication interface 36 can be in various known formats including an analog current level which varies between 4 and 20 mA; a HART® communication protocol in which digital information is modulated upon a 4-20 mA current; a communication protocol over a digital bus such as, for example, field bus (IEC 61158); or wireless communication over a wireless network using a wireless protocol such as, for example, WirelessHART® (IEC 62951).

With the measurement configuration shown in FIG. 1, both millivolt signals from thermopile 16 and resistance of RTD ambient temperature compensation resistor 18 can be measured using a four wire configuration like those used in temperature transmitters such as the Rosemount 3144P temperature transmitter with integrated EMF compensation. This allows sensor 12 to implement a much smaller RTD (i.e. PT100) for ambient temperature compensation that is capable of providing a more reliable measurement.

Figure 2:
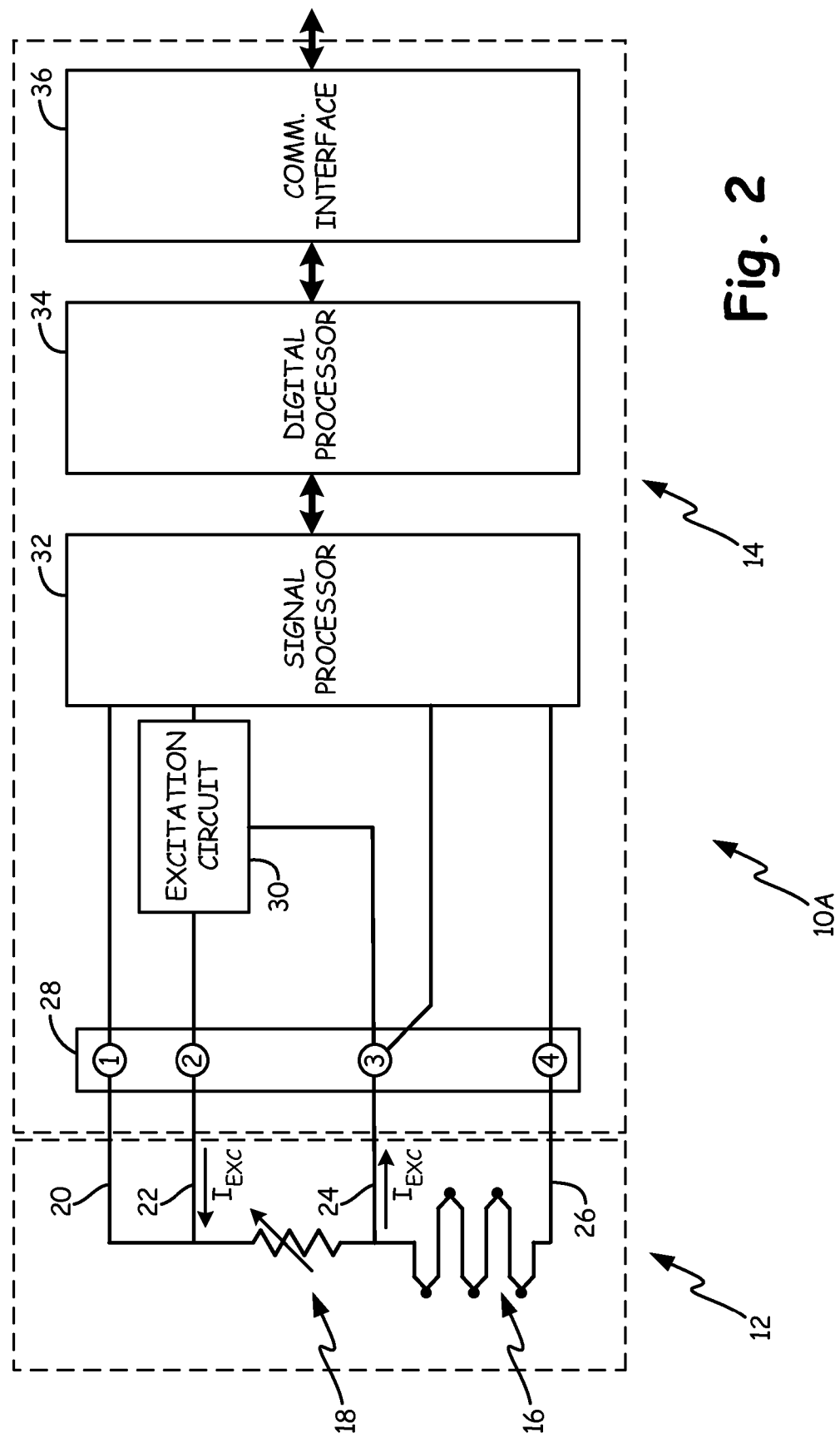
FIG. 2 is an electrical block diagram of another embodiment of an infrared spot sensor.

FIG. 2 shows IR spot sensor 10A, which is similar to IR spot sensor 10 of FIG. 1, accept that signal processor 32 is also connected to terminal 3 of terminal block 28. In this embodiment, $V_{COMP}$ is measured as a three wire measurement by signal processor 32, rather than a four wire measurement. When excitation circuit 30 is turned off, signal processor 32 measures voltage $V_1$ between terminals 1 and 4. Because no current flows through compensation resistor 18 with excitation circuit off, $V_1=V_{DET}$. When excitation circuit 30 is turned on, signal processor 32 measures voltage $V_2$ between terminals 1 and 3. The voltage between terminals 1 and 3 while excitation current $I_{EXC}$ flows through RTD 18 is equal to $V_{COMP}$ plus the voltage drop produced by current flow of $I_{EXC}$ through lead resistance $R_{24}$ of lead wire 24, i.e., $V_2=V_{COMP}+I_{EXC}\cdot R_{24}$.

While the three wire measurement includes lead wire error, it represents less error than is produced with two wire measurement of RTD 18. The three wire measurement provides a compensation value without the need to subtract one voltage measurement value from the other.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An infrared sensor comprising:
   a thermopile for producing a voltage as a function of temperature of a point of interest;
   a resistance temperature detector (RTD) that varies in resistance as a function of ambient temperature, the RTD connected in a series circuit with the thermopile;
   first and second leads connected to a first RTD terminal of the RTD;
   a third lead connected to a second RTD terminal of the RTD and a first terminal of the thermopile; and
   a fourth lead connected to a second terminal of the thermopile,
   wherein the second and third leads are configured to provide an excitation current to and from the RTD, and
   wherein the first and fourth leads are configured to provide an electrical path so that a voltage across the series circuit can be measured without electrically conducting the excitation current through the first and fourth leads.

2. The infrared sensor of claim 1 and further comprising:
   measurement circuitry connected to the first, second, third, and fourth leads for measuring a first voltage when no excitation current flows through the RTD and a second voltage when excitation current flows through the RTD.

3. The infrared sensor of claim 2, wherein the measurement circuitry produces a compensated temperature measurement value based on the first voltage and the second voltage.

4. The infrared sensor of claim 3, wherein the first voltage is a voltage between the first and fourth leads when no excitation current flows through the RTD.

5. The infrared sensor of claim 4, wherein the second voltage is a voltage between the first and fourth leads when excitation current flows through the RTD.

6. The infrared sensor of claim 4, wherein the second voltage is a voltage between the first and third leads when excitation current flows through the RTD.

7. The infrared sensor of claim 3, wherein the measurement circuitry comprises:
   an excitation circuit connected to the second and third leads for providing the excitation current when the second voltage is being measured;
   signal processing circuitry for producing a first voltage value based on the first voltage and a second voltage value based on the second voltage; and
   a digital processor for producing the compensated temperature measurement value based on the first voltage value and the second voltage value.

8. The infrared sensor of claim 7, wherein the excitation circuit is controlled by one of the signal processing circuitry and the digital processor.

9. The infrared sensor of claim 7, wherein the measurement circuitry includes a terminal block having first, second, third, and fourth terminals; wherein the first, second, third, and fourth leads are connected to the first, second, third, and fourth terminals, respectively; wherein the excitation circuit is connected to the second and third terminals; and the signal processing circuitry is connected to the first and fourth terminals.

10. The infrared sensor of claim 9, wherein the signal processing circuitry is also connected to the third terminal.

11. An infrared sensor comprising:
a resistance temperature detector (RTD) having a first RTD terminal and a second RTD terminal;
a thermopile having a first thermopile terminal and a second thermopile terminal, the first thermopile terminal connected to the second RTD terminal;
a first excitation current lead connected to the first RTD terminal;
a second excitation current lead connected to the second RTD terminal;
a first voltage sensing lead connected to the first RTD terminal;
a second voltage sensing lead connected to the second thermopile terminal; and
measurement circuitry for providing a temperature measurement value based upon a first voltage between the first and second voltage sensing leads when no excitation current flows through the first and second excitation current leads, and a second voltage between the first voltage sensing lead and either the second voltage sensing lead or the second excitation current lead when excitation current flows through the first and second excitation current leads.

12. The infrared sensor of claim 11, wherein the measurement circuitry produces a compensated temperature measurement value based on the first voltage and the second voltage.

13. The infrared sensor of claim 12, wherein the first voltage is a voltage between the first and second voltage sensing leads when no excitation current flows through the RTD.

14. The infrared sensor of claim 13, wherein the second voltage is a voltage between the first and second voltage sensing leads when excitation current flows through the RTD.

15. The infrared sensor of claim 13, wherein the second voltage is a voltage between the first voltage sensing lead and the second excitation current lead when excitation current flows through the RTD.

16. The infrared sensor of claim 12, wherein the measurement circuitry comprises:
an excitation circuit connected to the first and second excitation current leads for providing the excitation current when the second voltage is being measured;
signal processing circuitry for producing a first voltage value based on the first voltage and a second voltage value based on the second voltage; and
a digital processor for producing the compensated temperature measurement value based on the first voltage value and the second voltage value.

17. The infrared sensor of claim 16, wherein the excitation circuit is controlled by one of the signal processing circuitry and the digital processor.

18. The infrared sensor of claim 16, wherein the measurement circuitry includes a terminal block having first, second, third, and fourth terminals; wherein the first and second voltage sensing leads are connected to the first and fourth terminals, respectively; wherein first and second excitation current leads are connected to the second and third terminals, respectively; wherein the excitation circuit is connected to the second and third terminals; and the signal processing circuitry is connected to the first and fourth terminals.

19. The infrared sensor of claim 18, wherein the signal processing circuitry is also connected to the third terminal.

20. The infrared sensor of claim 11, wherein the first and second excitation current leads are configured to provide an excitation current to and from the RTD and the first and second voltage sensing leads are configured to provide an electrical path so that the first voltage between the first and second voltage sensing leads can be measured without electrically conducting the excitation current through the first and second voltage sensing leads.

* * * * *